US009198220B2

(12) United States Patent
Sugimoto et al.

(10) Patent No.: US 9,198,220 B2
(45) Date of Patent: Nov. 24, 2015

(54) METHOD AND APPARATUS FOR PROVIDING LOCAL BREAKOUT IN A MOBILE NETWORK

(75) Inventors: Shinta Sugimoto, Kanagawa (JP); Ryoji Kato, Kanagawa (JP); Toshikane Oda, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 927 days.

(21) Appl. No.: 12/674,390

(22) PCT Filed: Aug. 20, 2007

(86) PCT No.: PCT/EP2007/058617
§ 371 (c)(1),
(2), (4) Date: Apr. 13, 2010

(87) PCT Pub. No.: WO2009/024182
PCT Pub. Date: Feb. 26, 2009

(65) Prior Publication Data
US 2011/0286384 A1    Nov. 24, 2011

(51) Int. Cl.
*H04W 4/00* (2009.01)
*H04W 80/04* (2009.01)
*H04W 8/08* (2009.01)
*H04W 8/12* (2009.01)
*H04W 88/16* (2009.01)

(52) U.S. Cl.
CPC .............. *H04W 80/04* (2013.01); *H04W 8/082* (2013.01); *H04W 8/085* (2013.01); *H04W 8/12* (2013.01); *H04W 88/16* (2013.01)

(58) Field of Classification Search
CPC .................................................... H04W 80/04
See application file for complete search history.

(56) References Cited

U.S. PATENT DOCUMENTS

| 7,983,228 B1* | 7/2011 | Choksi .......................... 370/338 |
| 2004/0072564 A1 | 4/2004 | Iwahashi et al. |
| 2004/0204095 A1* | 10/2004 | Cyr et al. ....................... 455/560 |
| 2004/0208153 A1 | 10/2004 | Mizell |
| 2007/0232301 A1* | 10/2007 | Kueh ............................. 455/433 |
| 2007/0242628 A1* | 10/2007 | Dutta et al. .................... 370/310 |
| 2011/0299477 A1* | 12/2011 | Nikander et al. ............. 370/329 |
| 2013/0067560 A1* | 3/2013 | Zuk et al. ........................ 726/13 |

FOREIGN PATENT DOCUMENTS

| JP | 2003-087173 A | 3/2003 | |
| WO | 2007/073773 A | 7/2007 | |
| WO | WO 2007/082587 A | 7/2007 | |
| WO | WO 2007082587 A1 * | 7/2007 | .............. H04L 29/06 |

* cited by examiner

*Primary Examiner* — Samina Choudhry

(57) ABSTRACT

There is provided a Local Breakout Gateway node for use in a hierarchical mobile network. The node comprises a database, which stores a plurality of Local Breakout Policy rules. The node further comprises a receiver for receiving an IP packet from a Mobile Node attached to the network at which the node is located, the network being a visited network for the Mobile Node. The node further comprises means for selecting a Local Breakout Policy from the plurality of Local Breakout Policy rules, and means to apply the selected Local Breakout Policy to the received IP packet. The node further comprises a Network Address translation function to apply a Network Address Translation to the received IP packet, and a transmitter for sending the IP packet to a destination according to the applied Local Breakout Policy.

12 Claims, 8 Drawing Sheets

METHOD AND APPARATUS FOR PROVIDING LOCAL BREAKOUT IN A MOBILE NETWORK

TECHNICAL FIELD

The invention relates to the field of local breakout in a mobile network.

BACKGROUND

In a mobile network, when a user is using a network outside their home network, they are deemed to be 'roaming'. Any media sent from the user's mobile node in a visited network is sent via a visited domain gateway to a home domain gateway. The home domain gateway is located in the user's home network. The media is then passed to a network node for onward transmission or as the final destination of the media.

The term "local breakout (LBO)" is used to refer to a situation when traffic from a mobile node (MN) in a visited network is not routed via the user's home network, but is instead routed in a different way. It is advantageous for the control and management of this routing to remain with the home network, in order to apply any relevant policies regarding local breakout. LBO can reduce the load on the home network if media is not routed via the home network.

LBO is not deployed in many mobile networks, although different mechanisms can be employed to provide local breakout. An example network in which it would be advantageous to employ LBO is a 3GPP Systems Architecture Evolution (SAE) architecture (see 3GPP TR 23.882 V1.9.0, System Architecture Evolution), which is a hierarchical mobile network. The SAE architecture may use Proxy-Mobile IP (P-MIP) as a mobility protocol.

The roaming architecture of 3GPP SAE provides two SAE gateways serving the MN. The first is a Home Packet Data Network (PDN) SAE Gateway, and the second is a Visited PDN SAE Gateway. Each of the PDN SAE Gateways has an interface (SGi) towards the PDN associated with that Gateway.

Consequently, two IP addresses can be assigned to the MN, because the SAE architecture is designed to apply IP mobility management in a hierarchical manner. An IP address assigned by the Home Public Land Mobile Network (HPLMN) can be used for global communication. An additional IP address assigned by the Visited PLMN (VPLMN) is used by the MN for LBO. Each IP address has different roles, characteristics and meanings; the former IP address provided by the HPLMN is a permanent IP address, whereas the IP address provided by the VPLMN is a transient IP address used only for the duration of the MN's connection with the VPLMN.

The IP address provided by the VPLMN is used for LBO. However it is cumbersome for the MN to use two IP addresses, because it is not always clear which IP address can be used, and for what purpose.

Mobile IP (MIP), which is described in IETF RFC 3344, allows users of mobile communications devices to move from one network to another whilst maintaining a permanent IP address, regardless of which network they are in. This allows the user to maintain connections whilst on the move. For example, if a user were participating in a Voice Over IP (VoIP) session and, during the session the user moved from one network to another, without MIP support the user's IP address may change. This would lead to problems with the VoIP session.

A Mobile Node (MN) is allocated two IP addresses: a permanent home address and a care-of address (CoA). The CoA is associated with a node in the network that the user is currently visiting. To communicate with the MN, packets are sent to the MN home address. These packets are intercepted by a Home Agent in the home network, which has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets directly to another node via a foreign agent in the visited network. The foreign agent maintains information about visiting MNs, including the CoA of each visiting MN.

As described above, a P-MIP network (IETF draft-sgundave-mip6-proxymip6-01) can be used in a SAE network for IP mobility management. A P-MIP network is similar to a MIP network, but uses a Proxy Mobile Agent (PMA) function. This function emulates home link properties in order to make a MN behave as though it is on its home network and allows support for mobility on networks that would not otherwise support MIPv6.

A PMA is usually implemented at the access router. The PMA sends and receives mobility related signalling on behalf of a MN. When a MN connects to an access router having a PMA, the MN presents its identity in the form of a Network Access Identifier (NAI) as part of an access authentication procedure. Once the MN has been authenticated, the PMA obtains the user's profile from a policy store. The PMA, having knowledge of the user profile and the NAI, can now emulate the MN's home network. The MN subsequently obtains its home address from the PMA. The PMA also informs the MN's Home Agent of the current location of the MN using a Binding Update message. The Binding Update message uses the NAI of the MN. Upon receipt of the Binding Update message, the Home Agent sets up a tunnel to the PMA and sends a binding acknowledgement to the PMA. On receipt of the Binding Acknowledgement, the PMA sets up a tunnel to the Home Agent. All traffic from the MN is routed to the Home Agent via the tunnel.

The Home Agent receives any packet that is sent to the MN, and forwards the received packet to the PMA through the tunnel. On receipt of the packet, the PMA removes the tunnel header and sends the packet to the MN. The PMA acts as a default router on the access link. Any packets sent from the MN are sent via the PMA to the Home Agent, which then sends the packet on to its ultimate destination.

Where a P-MIP network is used with SAE, it would be advantageous to provide LBO without the possible problems caused by using two IP addresses for the MN. These problems include advertising multiple IP prefixes to the MN. The MN may be capable of using multiple IP addresses but it may not be knowledgeable about how each IP address should be used.

SUMMARY

The invention provides a method and apparatus for controlling local breakout in a mobile network that uses hierarchical mobility management coordination. According to one embodiment of the present invention, a new node, termed a Local Breakout Gateway (LBO Gateway) is proposed for use in a hierarchically managed mobile network. The LBO Gateway may be implemented as a functional component inside a Mobility Anchor. An LBO Gateway in a Global Mobility Management (GMM) Anchor interacts in a peer-to-peer manner with an LBO Gateway in a Local Mobility Management (LMM), exchanging information necessary for management of LBO. The mobility protocol that runs between the GMM Anchor and LMM Anchor may be used to transport information relating to LBO between the LBO Gateways. By using LBO Gateways, a home network operator is able to control the routing path of the user traffic during LBO according to the LBO policy of the home network operator. The invention obviates some of the problems described above, including that of a Mobile Node having multiple IP addresses.

According to a first aspect of the invention, there is provided a Local Breakout Gateway node for use in a hierarchical mobile network. The node comprises a database comprising a plurality of Local Breakout Policy rules, and a receiver for receiving an IP packet from a Mobile Node attached to the network at which the node is located, the network being a visited network for the Mobile Node. The node further comprises means for selecting a Local Breakout Policy from the plurality of Local Breakout Policy rules, and means to apply the selected Local Breakout Policy to the received IP packet. The node further comprises a Network Address translation function to apply a Network Address Translation to the received IP packet, and a transmitter for sending the IP packet to a destination according to the applied Local Breakout Policy.

It is preferred that the node further comprises an Application Layer Gateway function for performing Application Layer Gateway processing on the IP packet.

In order to ensure that the node is kept up to date with applicable policies, and can obtain the LBO policy relating to a particular MN, it is preferred that the node comprises means for receiving signalling from a Local Breakout Gateway node in the Mobile Node's home network, the signalling relating to Local Breakout policy negotiation, and means for updating the database as a result of the Local Breakout policy negotiation.

The signalling may sent between the Local Breakout node in the visited network and the Local Breakout node in the home network using an extended mobility protocol. In this case, the node may comprise means for sending Local Breakout policy information to a Local Breakout Gateway node in a home network, the information being sent in a Proxy Binding Update message, the Proxy Binding Update message indicating the capability of the visited network for performing Local Breakout, and means for receiving Local Breakout policy information from a Local Breakout Gateway node in a home network, the Local Breakout policy information being sent in a Proxy Binding Acknowledgement message.

Alternatively, the signalling may be sent between the Local Breakout node in the home network and the Local Breakout node in the visited network via Policy and Charging Rules Function nodes in the home and visited networks respectively.

The node may further include means to insert a tag into the IP packet header. The tag indicates the routing path of the IP packet according the Local Breakout Policy applied.

It is preferred that the database includes the following information:
 a data entry identifying the Mobile Node;
 for each entry, a permanent IP address and a transient IP address assigned to the Mobile Node; and
 at least one Local Breakout policy to be applied to the Mobile Node.

To account for the cases where more than one LBO policy may be applied, the database may further comprise an indication of priority associated with each Local Breakout policy. The indication of priority is then used to select a Local Breakout policy for the IP packet in the event that more than one Local Breakout policy applies to the IP packet.

According to a second aspect of the invention, there is provided a method of applying Local Breakout to an IP packet. The method comprises, at a Local Breakout node located in a visited network, receiving an IP packet from a Mobile Node attached to the visited network. A Local Breakout Policy is then selected from a plurality of Local Breakout Policy rules stored in a database, and the Local Breakout Policy is applied to the received IP packet. A Network Address Translation is also applied to the received IP packet, and the IP packet is transmitted to a destination according to the applied Local Breakout Policy.

DETAILED DESCRIPTION

Figure 1:
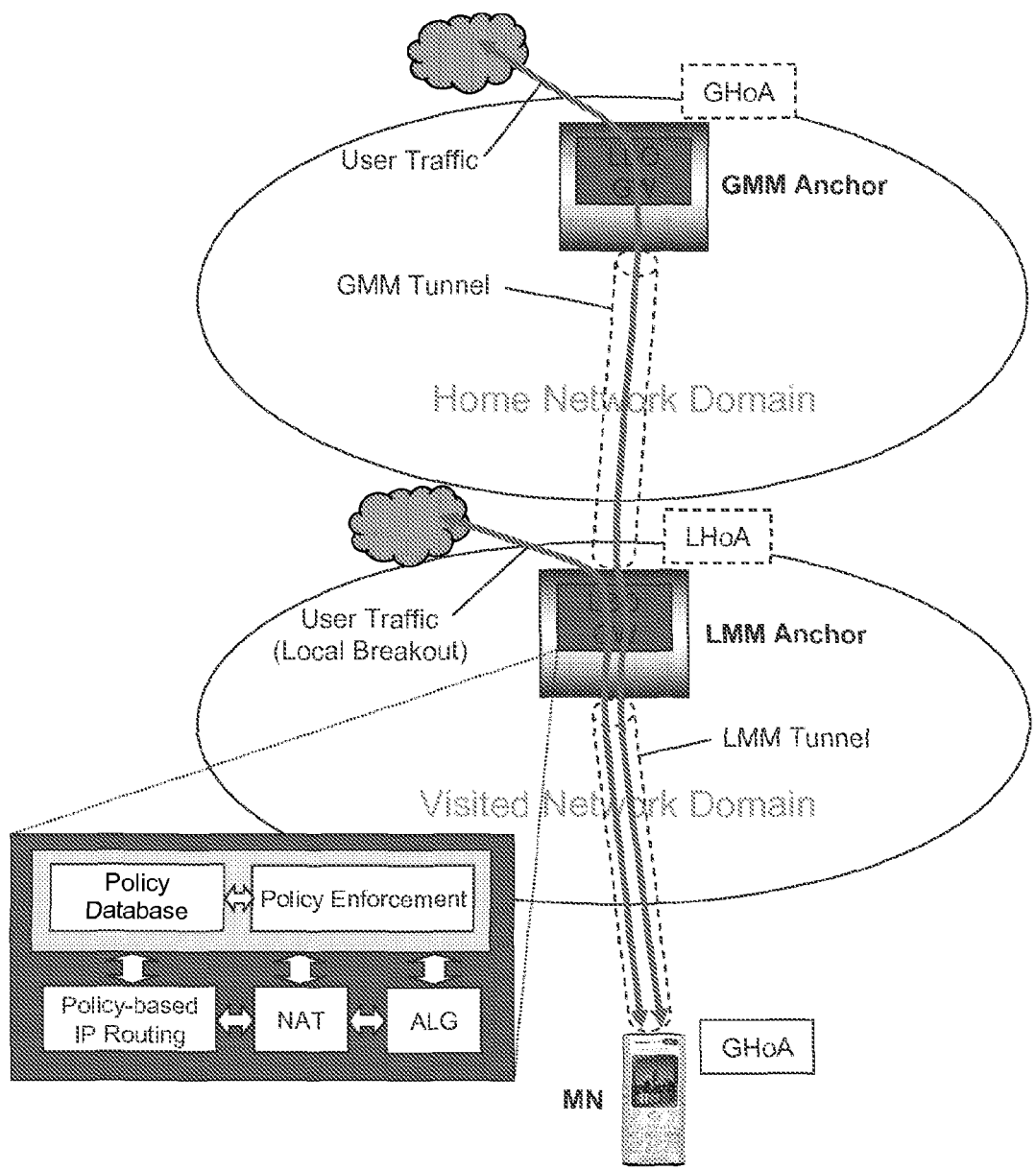
FIG. 1 illustrates schematically the architecture according to an embodiment of the invention.

Referring to FIG. 1, a Mobile Node (MN) is connected to a Visited Network, operated by a different network than the MN user's home network operator. In the home network domain, a GMM Anchor serves the MN as a global mobility anchor. In the visited network domain, an LMM Anchor serves the MN as a local mobility anchor. In each network, a unique IP address is assigned to the mobile node, the IP addresses being a Global Home Address (GhoA) and Local Home Address (LhoA), respectively. The mobile node uses its GHoA for its communication. An LBO Gateway (LBO GW) is located at each of the GMM Anchor and LMM Anchor.

A mobility protocol between the GMM and LMM Anchors is used to transport information exchanged between the LBO Gateways, such as LBO policy information, a list of IP addresses assigned to the MN and so on. Negotiation of the LBO policy is also conducted between the LBO Gateways.

User traffic can be either locally broken out or tunnelled back to its home network. In the case of LBO, it may be advantageous for the MN to shortcut the routing path to its peer. The MN maintains its GHoA for communication in the case where LBO has occurred, rather than using its LhoA.

Figure 2:
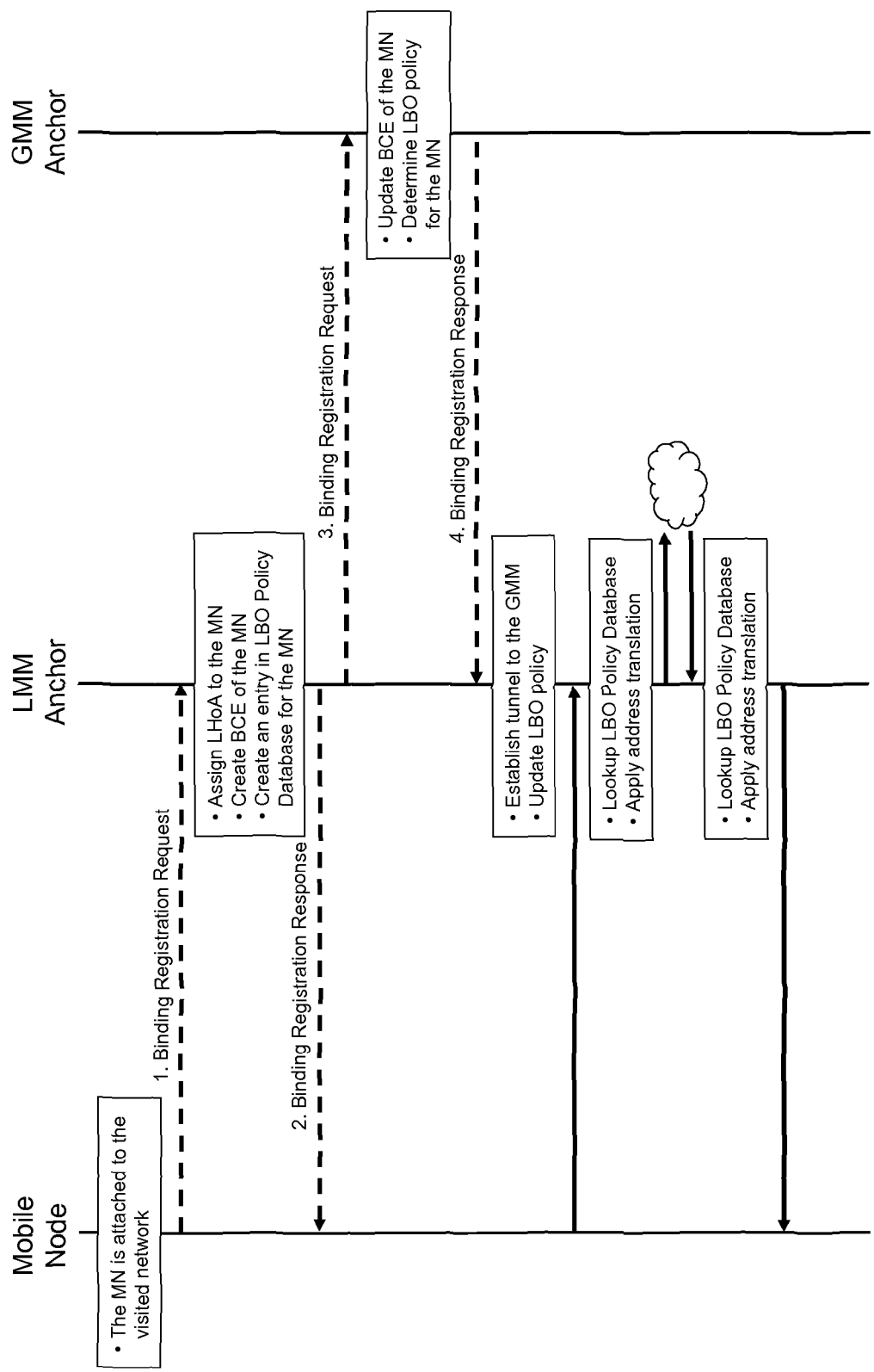
FIG. 2 illustrates schematically signalling in the control plane and user plane of a hierarchical mobility management network.

Referring to FIG. 2, a flow sequence of the control and user plane in a hierarchical mobility management network is illustrated. In this example, a MN is attached to a visited network where a LMM Anchor serves the mobile node to handle local mobility management, and so could be implemented in the architecture illustrated in FIG. 1. The LBO Gateways in the visited network and home network are not illustrated because they are functional components of the LMM and GMM Anchors in the visited and home networks respectively.

When the MN attaches to the visited network, it is authenticated by the network and authorized to be served by the home and visited mobile operators as a roaming client. Once the MN is authenticated it performs binding registration to the LMM Anchor. Accordingly a BCE for the MN is created at the LMM Anchor. The LMM Anchor also creates a new entry in a LBO Database (described below) because it supports LBO. The LMM Anchor performs a binding registration towards the GMM Anchor acting on behalf of the MN. The GMM Anchor updates the BCE of the MN, i.e., updating the current location of the MN according to the binding registration request made by the LMM Anchor. Since the Binding Registration Request indicates that the LMM Anchor supports LBO, the LBO Gateway functional component inside the GMM Anchor determines an LBO policy for the MN. The policy information is then piggybacked to the Binding Registration Response message sent to the LMM Anchor. Accordingly the LMM Anchor updates the LBO policy entry for the MN. Subsequently, user traffic generated by the MN or destined to the MN can be the subject of LBO.

Note that network-based mobility protocol (e.g. Proxy Mobile IPv6) can also be used. In this case, entities that send or receives mobility signalling messages may differ from those illustrated in FIG. 2. In a PMIPv6 network, a PMA sends or receives mobility signalling messages on behalf of the MN.

Figure 3:
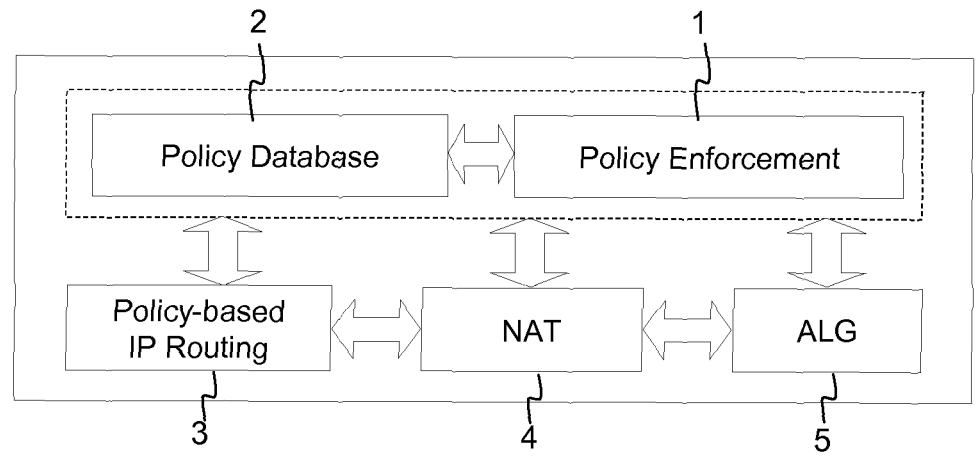
FIG. 3 illustrates schematically the functional components of a Local Breakout Gateway.

An LBO Gateway enables LBO according to the policies negotiated by the network operators. An LBO Gateway includes various functional components, as illustrated in FIG. 3. These components are:

Policy Enforcement 1 and Policy Database 2
LBO Policy-based routing 3
Network Address Translation (NAT) 4
Application Level Gateway (ALG) 5

The LBO policy management function plays a key role in LBO as it governs routing decisions. The Policy-based IP routing and NAT components are closely related because addressing and routing are related each other in the IP network model. The NAT and ALG components are also related in the sense that the ALG may be required to handle network information that has been modified by the NAT such as the IP address and port number.

Figure 4:
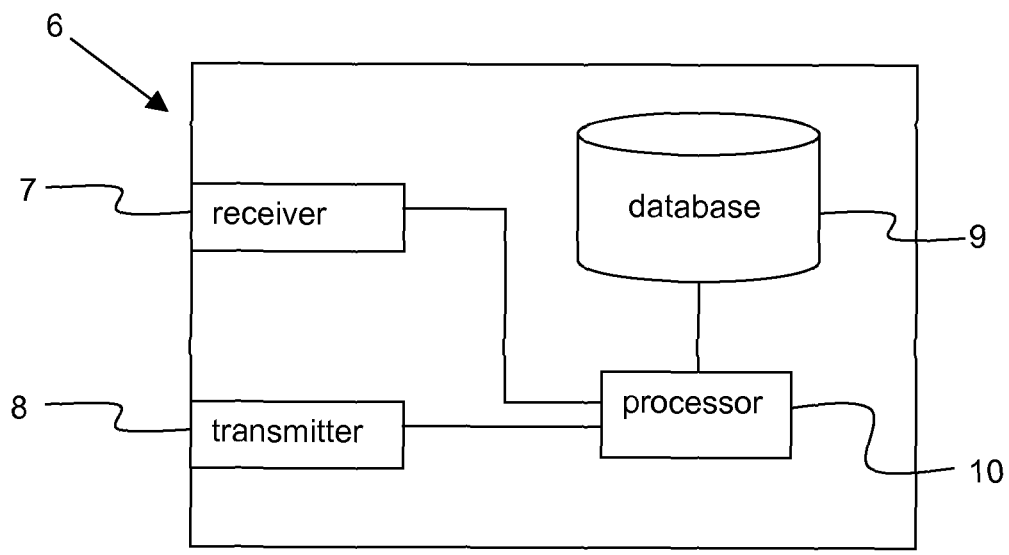
FIG. 4 illustrates schematically the components of a Local Breakout Gateway according to an embodiment of the invention.

Whilst a LBO Gateway is a consolidation of the functional components, each functional component can be implemented separately in different nodes. Alternatively the LBO Gateway may be integrated with another network node such as a Serving SAE Gateway or a Visited PDN SAE Gateway in the 3GPP SAE network architecture. FIG. 4 illustrates an LBO Gateway implemented in a single box 6. The LBO comprises a receiver 7 and a transmitter 8 for receiving and transmitting IP packets. It further comprises a memory 9 for storing the LBO policy database and a processor 10 for analysing incoming packets, referring to the database 9 and applying LBO policies to the packets as necessary.

Figure 5:
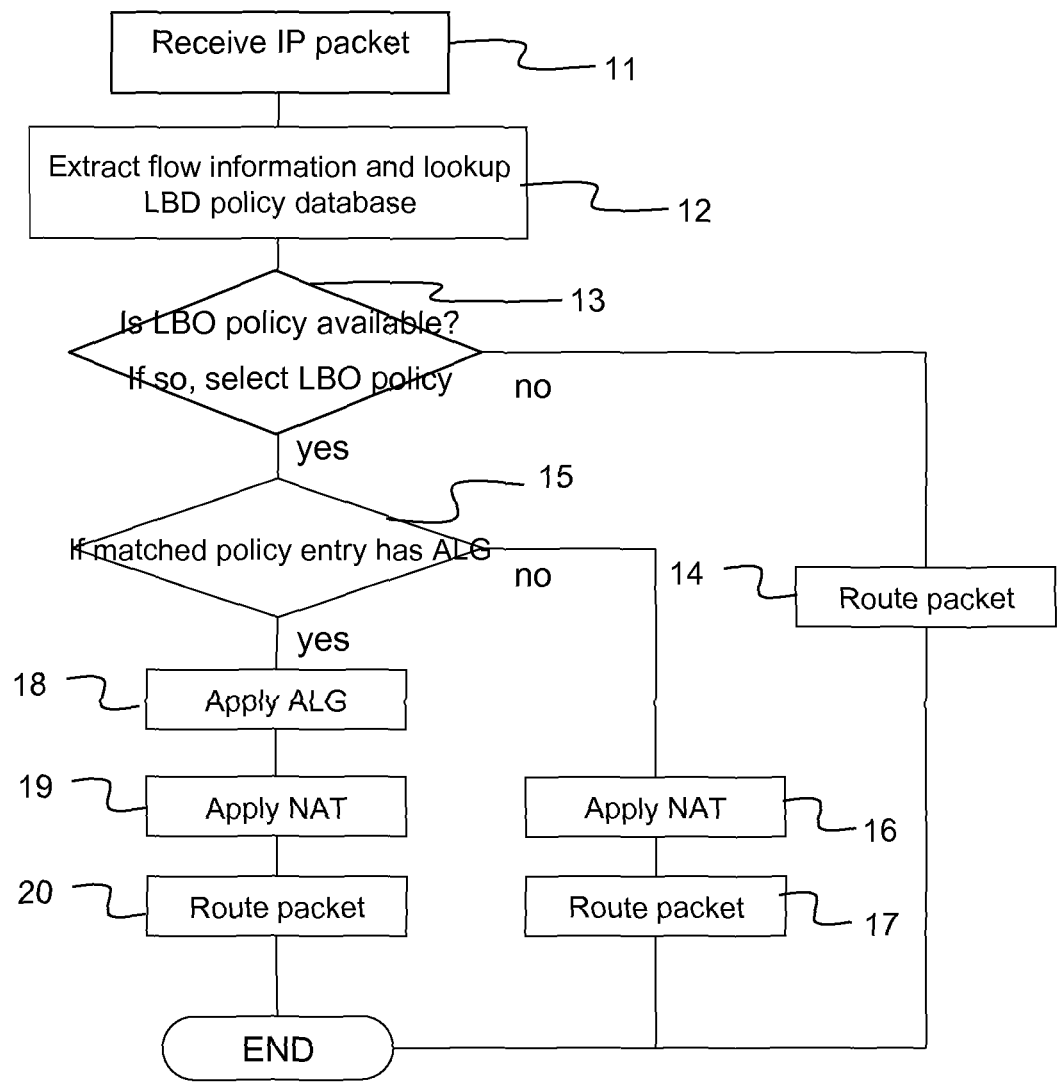
FIG. 5 is a flow diagram illustrating packet processing performed by the LBO Gateway according to an embodiment of the invention.

FIG. 5 is a flow chart illustrating the packet processing performed by the LBO Gateway. The LBO Gateway performs packet filtering based on a LBO Policy Database and makes the decision of whether to perform LBO.

When an IP packet is received 11, the policy enforcement component extracts 12 the flow information (5-tuple) from the IP packet, and the LBO Policy Database is checked 13 up to see if there is matching policy. For IP packets that are not to be targeted for LBO, no specific processing is performed, although normal IP routing 14 is performed by the LBO Gateways. If IP packets are the targets of LBO, a check is made to see if the matched policy requires ALG 15. If ALG is not required, then NAT is applied 16 to the packet and the packet is routed 17. If ALG is required, then ALG is applied 18, NAT is applied 19, and the packet is routed 20.

An LBO Gateway can be considered as a router in the sense that it forwards IP packets from one interface to another. The LBO Gateway performs policy-based routing as well as address translation according to the LBO Policy Database.

In order to make sure that all uplink and downlink IP packets to be processed by the LBO Gateway are processed, a policy enforcement point must be properly placed. At the policy enforcement point, flow information is extracted from the IP packet and it is compared with entries contained in the LBO Policy Database. The flow information (5 tuple) and the detailed information of supported ALG application types are extracted from the IP packet and compared with the entries of the LBO Policy Database. The policy database can be implemented in a way that each policy entry has a priority value based on different criteria. If there are more than one policy entries matched with a given flow, the entry with the highest priority value is be selected and subsequent packet processing will be executed.

Regarding the NAT, address translation is necessary in order to perform LBO in the network environment, because the IP address to be used by the MN to send or receive IP packets must be consistent with the topological location of the Mobility Anchor through which the IP packet is routed. Even if there is no inspection of the source IP address (e.g. ingress filtering) to be done in the network, there is an issue with the return path; the peer will normally send a response to the source IP address of the IP packets in the previous communication.

The LBO Gateway maintains an address mapping table in the same way that a normal NAT device does. Each entry of the mapping table contains an association between the permanent IP address and transient IP addresses for a MN.

Address translation in LBO Gateway is done according to the LBO Policy Database.

Note that the consequence of address translation may impact the ALG in some cases where the application needs to deal with network information such as IP address and/or port number.

The LBO Gateway may also serve as an ALG based on the LBO Policy Database. The behaviour of the ALG is specific to the application since the ALG is defined inherently for each application. ALG processing in the LBO Gateway is performed according to the LBO Policy Database.

DNS-ALG, as described in RFC 2694, can be extended to ensure that the ALG modifies a DNS response from a DNS server according to the LBO Policy Database. This ensures that the home network operator can control the behaviour of the MN in terms of name resolution (name-to-address). In a DNS database, a Fully Qualified Domain Name (FQDN) may be associated with more than one IP addresses (A or AAAA records, which are types of DNS resource record) for redundancy. An example modification made by the ALG is reducing the number of candidate IP addresses that are included in the response to a DNS request.

Management of LBO policy is a key role of an LBO Gateway because all the decisions of IP routing, address translation and the ALG are made according to the policy used by the LBO Gateway. An LBO Policy Database is a database in which LBO policies are stored.

An LBO policy is determined and configured according to negotiations conducted between the home network operator and the visited network operator for the MN. The LBO Gateways at the home and visited networks negotiate LBO Policy Information during LBO Policy Negotiation. LBO Policy Negotiation may be conducted by either out-of-band signalling, or using the mobility protocol between the home and visited network domain. LBO Policy Negotiation can be initiated either by the LMM Anchor or the GMM Anchor. LBO Policy Negotiation can be triggered by various events, such as the LMM Anchor receiving uplink traffic from the MN. The LBO Policy Database is dynamically updated according to the results of the LBO Policy Negotiation.

The traffic flow may be described in the LBO database using the following information:
- Source traffic selector (start IP address, end IP address, start port number, and end port number)
- Destination traffic selector (start IP address, end IP address, start port number, and end port number)
- IP protocol (e.g. TCP)
- LBO level (1-5)

This information is used to determine if a given traffic flow should be the subject of LBO or not.

The concept of the traffic selector is derived from the IKEv2 specification (C. Kaufman, et al., "Internet Key Exchange (IKEv2) Protocol," RFC 4306, December 2006).

The LBO level indicates the degree of desire for local breakout in descending order from 1 to 5. The LBO Policy Negotiation is done in a way that the visited network operator must obey any policy suggested by the home network operator.

Once the LBO Policy Database is formulated in the visited network, the decision of LBO can be locally made at the visited network domain without consulting the home network domain. However, in some circumstances it may be desirable for the visited network domain to request input from the home network domain regarding the policy to be adopted for a given traffic flow.

Regarding the logical structure of the visited network LBO Policy Database, the first level of the database is a list of registered MNs. When a MN is attached to a visited network domain, a registration must be made to the LBO Policy Gateway in order to activate LBO support for the MN. Note that the actual procedure of the registration is not performed by the MN itself but by other network entities (e.g. the GMM anchor and/or the LMM anchor). Each entry contains sufficient information to identify each MN. Permanent and transient IP addresses for each MN are included in each entry of the list.

The second level of LBO Policy Database is a policy table, which is a set of policies for a given MN. Each policy entry contains the following information.
- Identity of MN
- Direction of the policy (uplink or downlink)
- Flow information. 5 tuple (source IP address, destination IP address, source port, destination port, and upper layer protocol) is used to identify flow. The upper layer protocol information contains the IP protocol number and also application specific information, which is useful for multiplexing the flow for ALG.
- Template of the expected processing of NAT and ALG. A template comprises instructions as to how the NAT and ALG must be performed on the packet flow. A template consist of following information:
  - NAT—The mapping of IP addresses: the permanent IP address and the transient IP address for a given MN.
  - ALG—Application specific information required for expected ALG processing.

Figure 6:
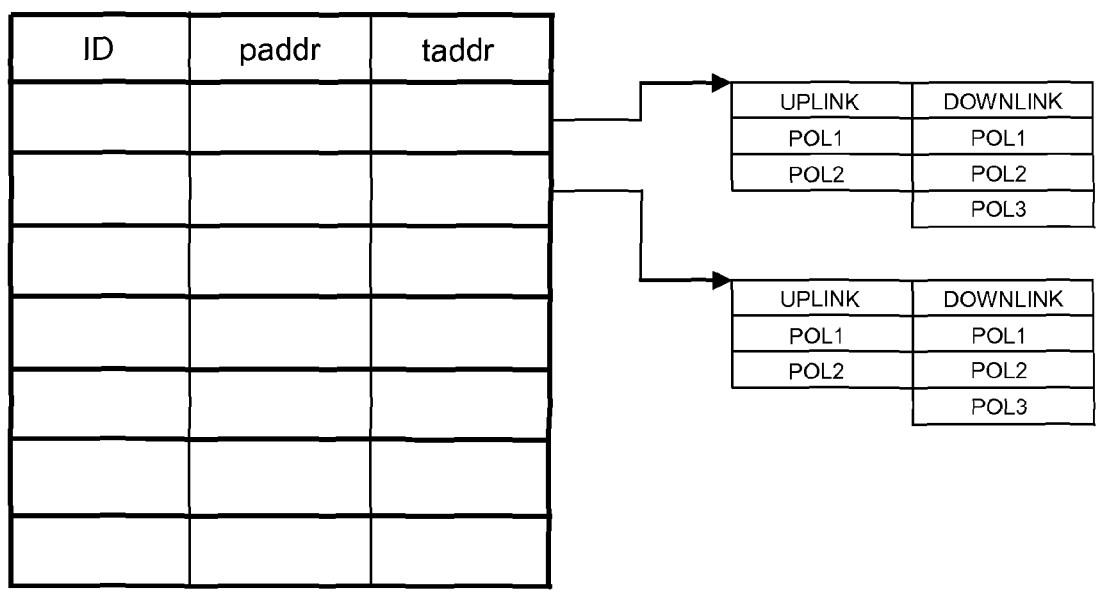
FIG. 6 illustrates schematically a relationship between the contents of a LBO Policy Database.

FIG. 6 illustrates the relationship between the first and second levels of the LBO Policy Database. As the figure shows, each first level entry having a MN ID, permanent address and temporary address has a link to an associated policy table.

The invention may be implemented in different types of network. According to an embodiment of the invention, it may be applied to a 3GPP SAE Network (as described in 3GPP TS 23.402 3GPP System Architecture Evolution Architecture Enhancements for non-3GPP accesses, Release 8). The 3GPP SAE roaming architecture can be considered as a hierarchical mobility management network from IP mobility management perspective, and so the present invention can be implemented in a 3GPP SAE network.

Figure 7:
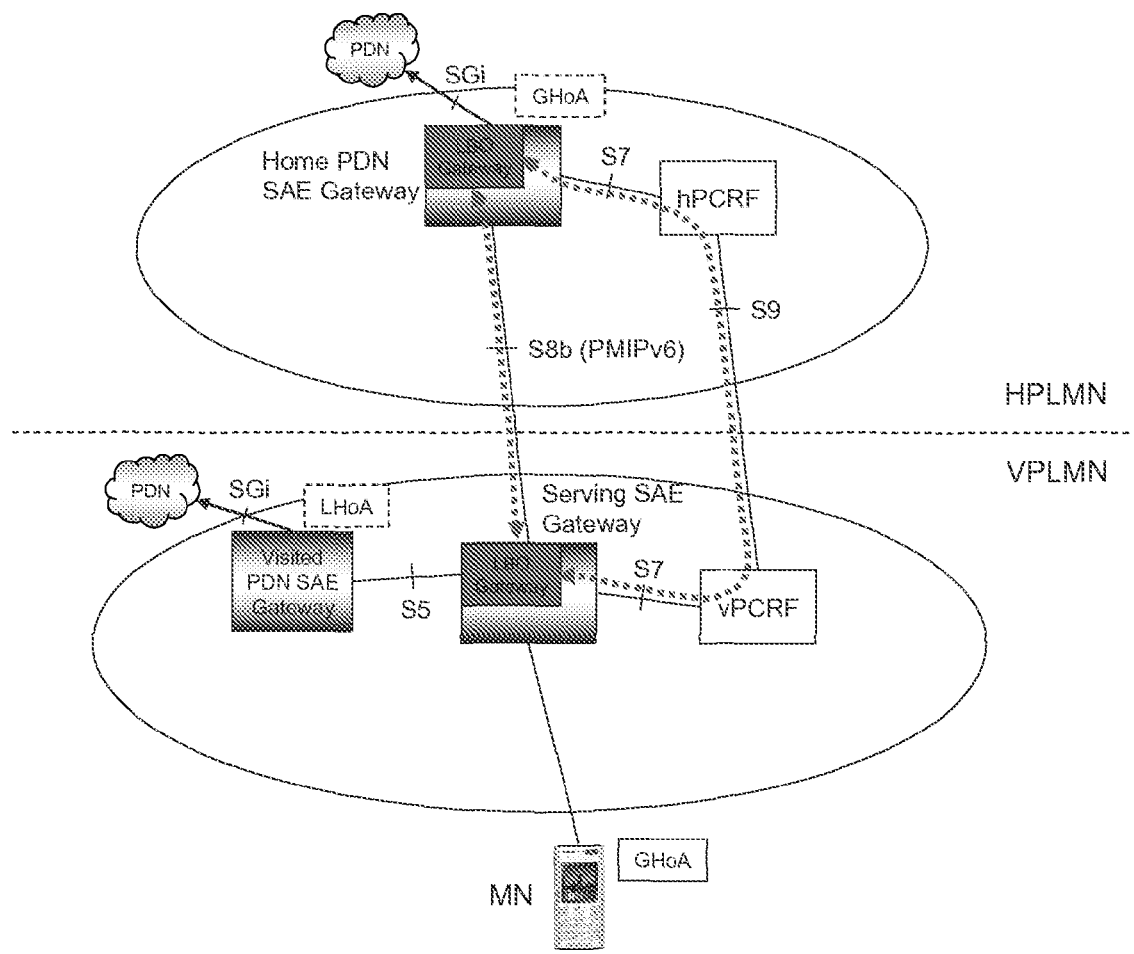
FIG. 7 illustrates schematically the architecture of an embodiment of the invention when using 3GPP SAE roaming architecture.

FIG. 7 illustrates an example network scenario of a 3GPP SAE roaming architecture using LBO Gateways. In a Home Public Land Mobile Network (HPLMN), a Home Packet Data Network (PDN) SAE Gateway serves the MN as a GMM Anchor. A GHoA is assigned to the MN from an IP address pool by the Home PDN SAE Gateway. In a Visited Public Land Mobile Network (VPLMN) in which the MN is roaming, there are two network entities serving for the MN, namely a Visited PDN SAE Gateway and the Serving SAE Gateway. A LHoA is assigned to the MN an IP address pool of the Visited PDN SAE Gateway. The combination of the Visited PDN SAE Gateway and the Serving SAE Gateway is equivalent to a LMM Anchor. Note that the Visited PDN SAE Gateway and the Serving SAE Gateway may be separate, or disposed in a single box. In this example, it is assumed that Proxy Mobile IPv6 is used as the protocol for the roaming interface (S8b).

LBO capability can be provided to the MN by integrating an LBO Gateway in the Home PDN SAE Gateway and the Serving SAE Gateway. Where Proxy Mobile IPv6 is used as the roaming interface protocol, a set of extensions are made to the Proxy Mobile IPv6 to carry information for setting up the LBO Gateway and the LBO Policy Database in the VPLMN.

LBO Policy Negotiation may be performed in various ways. One way to conduct the negotiation is to use the mobility protocol that runs between the GMM Anchor and LMM Anchor. Thus in this example, LBO policy information is carried by the Proxy Mobile IPv6 signalling messages. Alternatively, LBO Policy information is carried over a Policy Control and Charging (PCC) functions in the 3GPP architecture, namely by the home Policy and Charging Rules Function (hPCRF) and the visited Policy and Charging Rules Function (vPCRF). As shown FIG. 7, the Home PDN SAE Gateway and the Serving SAE Gateway have an interface (S7 interface) to the hPCRF and vPCRF, respectively. Hence it is possible for the LBO Gateways to exchange LBO policy information over S7 and S9.

Figure 8:
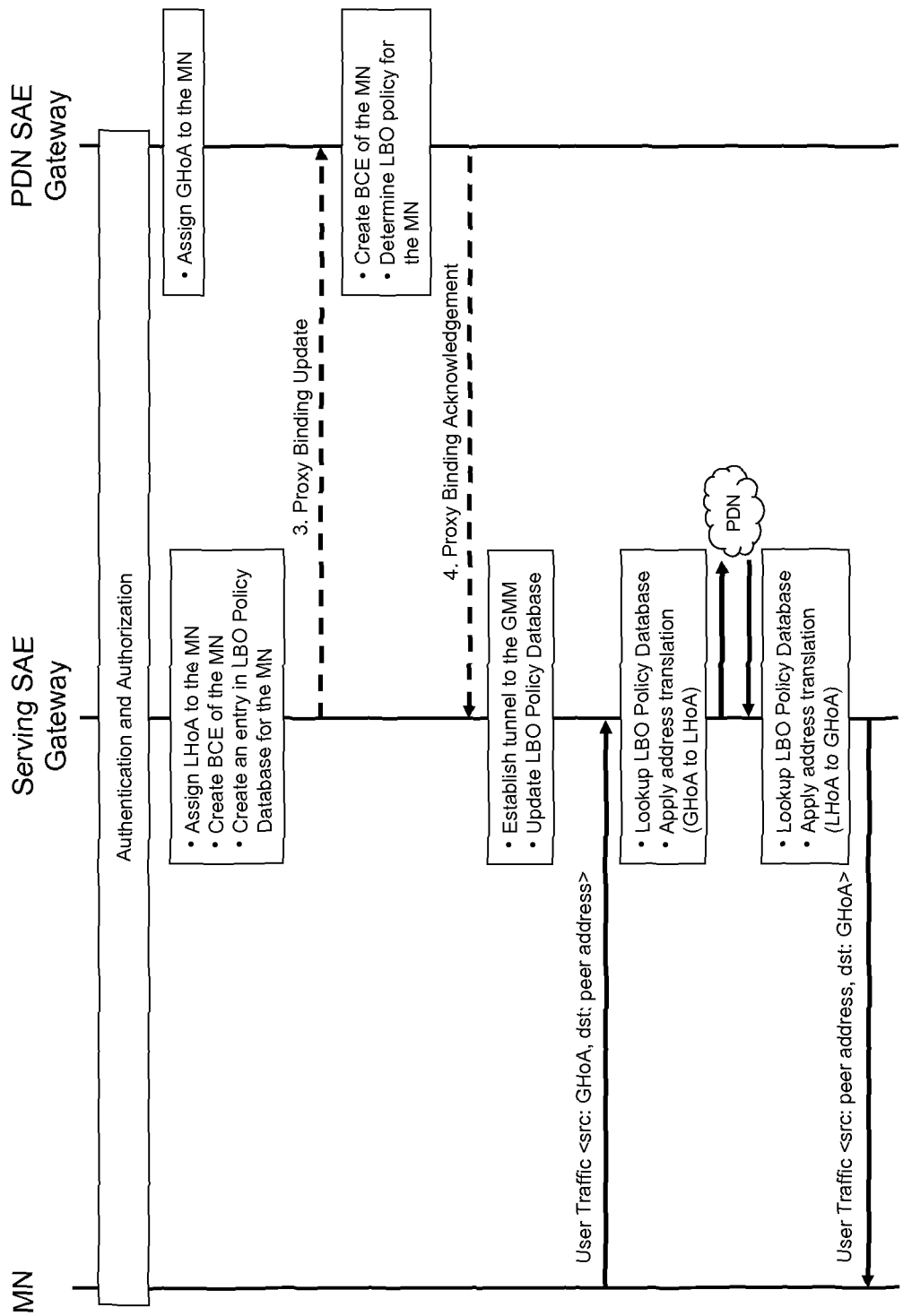
FIG. 8 illustrates schematically signalling for LBO Policy Negotiation and proxy binding registration when using the architecture shown in FIG. 6.

FIG. 8 illustrates the signalling required for LBO Policy Negotiation along with the proxy binding registration. The procedure of authenticating and authorizing the MN is not shown in FIG. 8 for simplicity. The Serving SAE Gateway, which is playing the role of a Proxy Mobile Agent (PMA), sends a Proxy Binding Update (PBU) message to a Home PDN SAE Gateway, which is the Local Mobility Anchor (LMA). Relevant the LBO policy information is included in the PBU message. The information is formatted as described above for the LBO Policy Database. The LMA processes the PBU message and creates a BCE for the MN. In addition, LBO policy information is extracted from the PBU message and passed to the LBO Gateway in the home network. The home LBO Gateway inspects the LBO policy information and formulates a response message according to its LBO Policy Database. The response message is contained in the PBA message and sent to the Serving SAE Gateway. The Serving SAE Gateway updates the visited LBO Policy Database according to the LBO policy information received in the response message. Subsequently, user traffic from the MN can be locally broken out at the Serving SAE Gateway. Such LBO user traffic is routed to the Visited PDN SAE Gateway over the S5 interface.

In an alternative embodiment, the invention can be implemented in networks where Proxy Mobile IPv6 (PMIPv6) (see S. Gundavelli, K. Leung, V. Devarapalli, B. Patil, "Proxy Mobile IPv6," draft-ietf-netlmm-proxymip6-00, internet-draft, work-in-progress) is used for both GMM and LMM protocols.

In such a network, the LMA in the home network serves as a GMM Anchor for the MN. In the visited network domain, there is a LMM Anchor that has capabilities of both a LMA and a PMA. The LMM Anchor plays role of a PMA in the sense that it registers binding of the MN to the GMM Anchor. On the other hand, within the visited domain, the LMM Anchor plays role of a LMA, receiving proxy binding registration from the PMA to which the MN is attached. The MN has two IP addresses, namely a GHoA and a LHoA. The GHoA and the LHoA are obtained from the IP address pool of the GMM Anchor and LMM Anchor, respectively.

In order to provide LBO capability for the MN, an LBO Gateway is integrated in each of the GMM Anchor and the LMM Anchor. In order to execute LBO for uplink traffic, the LBO Gateway inside the LMM Anchor performs address translation by overwriting the source IP address (GHoA) with the LHoA for the MN and, if necessary, modifies upper layer protocol information. For downlink traffic, the LBO Gateway in the LMM Anchor rewrites the destination IP address of the IP packet, by replacing the LHoA with the GHoA.

The LMA in the LMM Anchor needs to create a specific binding database for the MN. The binding is in two levels; GHoA-LHoA, and LHoA-CoA. The Mobile Access Gateway (MAG) is configured in such a way that it advertises the home prefix from which the GHoA is derived, in order to obviate the problems in the prior art of multiple IP addresses.

According to yet a further embodiment, the invention may be implemented in a Hierarchical Mobile IPv6 (HMIPv6) network (see H. Soliman, C. Catelluccia, K. El Malki, and L. Bellier, "Hierarchical Mobile IPv6 mobility management (HMIPv6)," RFC 4140).

According to HMIPv6, a Mobile IPv6 Home Agent in a home network serves as a GMM anchor and the Mobility Anchor Point (MAP) in a visited network serves as a LMM anchor for the MN. There are two IP addresses assigned to the MN; a Home Address (HoA) and a Regional Car of Address (RcoA). The HoA is a MIPv6 home address whereas the RCoA is a regional care-of address, which is used by the MN in the visited network.

The LBO Gateway can be integrated in the MAP in the visited domain. The LBO Gateway is aware of the two IP addresses assigned to the MN, and performs LBO according to the LBO Policy Database.

In order to execute local breakout for uplink traffic, the LBO Gateway performs address translation in a HMIPv6-specific way; the LBO Gateway removes the outer header (src: RCoA, dst: HA) which is the tunnelling header for the HA-MN tunnel, and performs address translation for the original IP header (src: HoA, dst: CN). The source IP address (HoA) is overwritten with the RCoA and, if necessary, upper layer protocol information is modified.

There are various extensions that can be made to invention as described above in the various embodiments. Network operators can configure the LBO Policy Database based on variety of information. The information can be either dynamic or static. This information includes, but is not limited to:
  User profile (subscriber information), stored in the HSS;
  User preferences based on input data made by the user dynamically;
  The type of wireless access that is currently active on the MN;
  The type of applications that the MN is running;
  The type of peer with which the MN is communicating;
  The location of the MN; and
  Agreement between the home and/or visited network operators of the communicating peer and the home and/or visited network operators of the MN Furthermore, the LBO Policy Negotiation by the HPLMN and VPLMN can be conducted by using the roaming interface with some extensions. For instance, it is possible to use extended PMIPv6 to support LBO Policy Negotiation. In PMIPv6, PBU and PBA messages can be extended to carry the LBP Policy information.

The LBO Policy Negotiation can be conducted with or without the support of AAA infrastructure. Furthermore, LBO Policy Negotiation can be conducted involving PCC entities (hPCRF and vPCRF).

In the network environment where PMIPv6 is used as a LMM protocol, part of the LBO Policy Database and PMIPv6 binding database can be shared. The information to identify a MN can be a GHoA and LHoA.

The LBO Gateway can interact with the LMM anchor by the protocol described above. The LBO Gateway may insert a tag to the IP packet indicating the selection made for the routing path. The LBO Gateway will route the packet according to the tag information. The tag is removed after the packet processing is performed. Alternatively, the LBO Gateway may leverage source routing.

Figure 9:
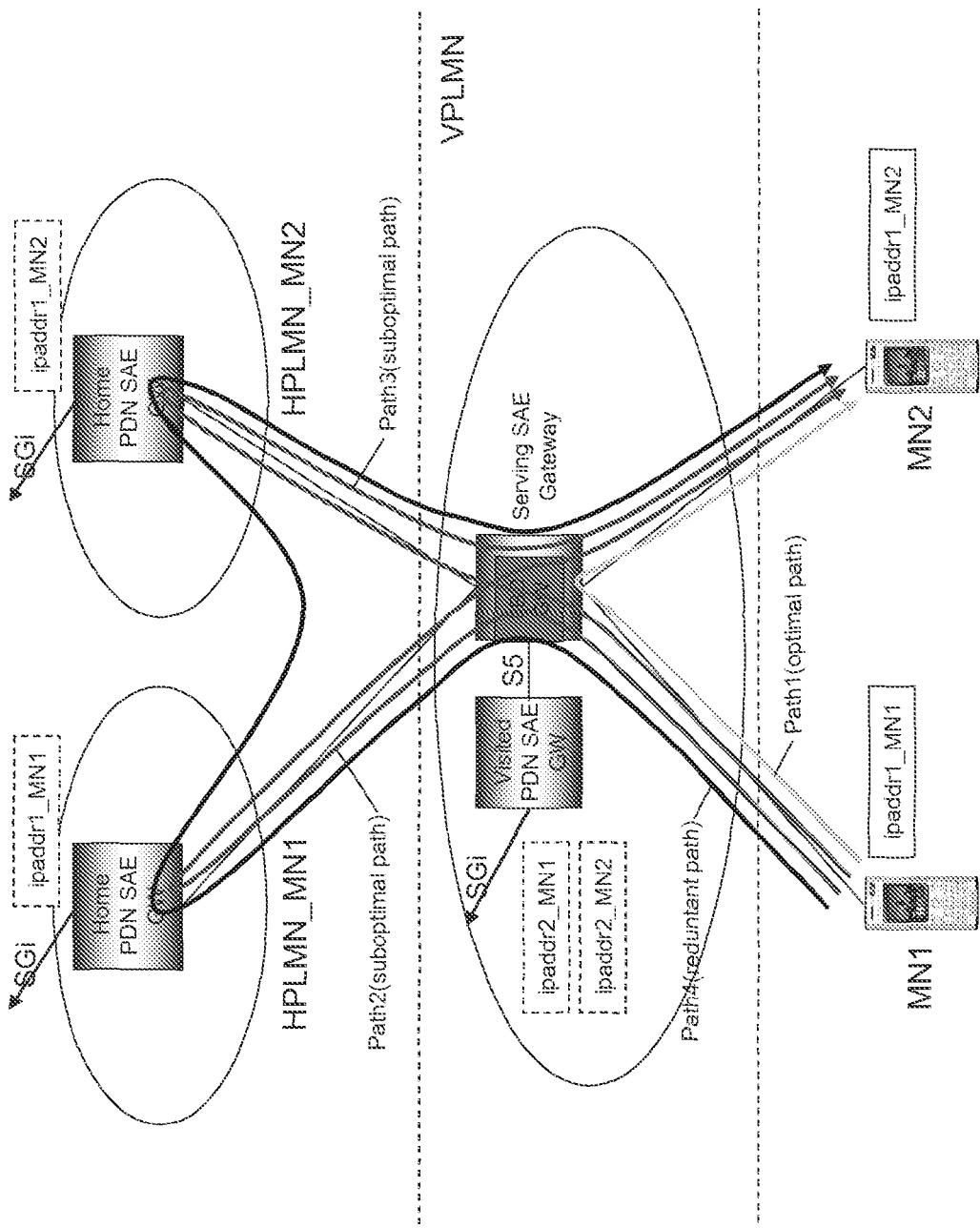
FIG. 9 illustrates schematically example route paths between the two MNs that are visiting the same VPLMN.

Another aspect of the present invention is that the LBO Gateway can select a routing path for IP packets. The LBO Gateway makes it possible for network operators to execute fine-grained routing path selection based on the LBO Policy Database. FIG. 9 illustrates a variety of route paths between the two MNs that are visiting the same VPLMN. In this example, it is assumed that both MN1 and MN2 have two IP addresses; one in its HPLMN and one in the VPLMN. Note that any of the packet routing paths depicted in FIG. 9 are not illustrated as going through the LBO Gateway for clarity, but all uplink and downlink traffic must go through the LBO Gateway as described above.

The LBO Gateway can effectively redirect the flow of IP packets from a MN by a combination of techniques. Those techniques are address translation and signalling to the LMM anchor to inform the LMM anchor of the expected routing path. Address translation is executed by the LBO Gateway to redirect subsequent routing path because the intermediate routers perform IP routing referring to the destination IP address of the IP packet. In some cases, overwriting the source and/or destination addresses may not take effect on redirecting the IP packet. In such a case, the LBO Gateway signals the LMM anchor to inform the LMM anchor which routing path the IP packet should take. Note that there is no involvement of mobility protocol in the present route optimization scheme.

Suppose that MN1 sends an IP packet to MN2. Mainly there are four choices in terms of the packet routing path as below:
  Path1 is the optimal path. The Serving SAE Gateway routes the packet from MN1 directly to MN2. It is assumed that Serving SAE Gateway injects the packet to the mobility tunnel for the MN2.

Path2 is a suboptimal path. The HPLMN of MN2 agrees to route-optimize the inbound traffic for MN2 whereas the HPLMN of MN1 does not agree to route-optimize the outbound traffic of MN1.

Path3 is also a suboptimal path. The HPLMN of MN1 agrees to route-optimize the outbound traffic of MN1 whereas the HPLMN of MN2 does not agree to route-optimize the inbound traffic for MN2.

Path4 is the most redundant path. Neither of the HPLMNs agrees to route-optimize the packet. The IP packet travels all the way from MN1, Serving SAE Gateway, HPLMN of MN1, HPLMN of MN2, and the Serving SAE Gateway again, to MN2. By default, this routing path is selected.

The LBO Gateway can selectively make a routing path selection according to the LBO policy negotiated with each HPLMN serving the MNs. All IP packets are inspected by the LBO Gateway. The route optimization is executed by the LBO Gateway with the policy-based IP routing mechanism in conjunction with the address translation mechanism. The LBO Gateway may also leverage other techniques to enforce IP packet routing to follow the selected path. For instance, the LBO Gateway may insert a tag, which indicates which routing path the packet should take to the destination. The LBO Gateway may also leverage a source routing mechanism.

Note that this mechanism is only effective for selective routing path selection when both of communicating peers are visiting the same VPLMN. A different mechanism is required when either of the peers is visiting another VPLMN. In this case, interactions between the LBO Gateways in the relevant VPLMNs are required.

The invention provides several benefits to both network operators and users. The following is the list of advantages. It solves the problem of a MN having multiple IP addresses in hierarchical mobility management networks. It also enables local breakout, which can be totally controlled by the network operator. Furthermore, it allows the MN to have a single IP address, and no changes are required to the MN.

It will be appreciated by the person of skill in the art that various modifications may be made to the above described embodiments without departing from the scope of the present invention.

The following abbreviations are used in this specification:
ALG Application Level Gateway
DNS Domain Name System
GHoA Global Home Address
GMM Global Mobility Management
HMIPv6 Hierarchical Mobile IPv6
HPLMN Home PLMN
HA Home Agent
HSS Home Subscriber Server
IKEv2 Internet Key Exchange Protocol version 2
LBO Local Breakout
LHoA Local Home Address
LMA Local Mobility Anchor
LMM Local Mobility Management
MAG Mobile Access Gateway
MAP Mobility Anchor Point
MIP Mobile IP
MIPv6 Mobile IPv6
MN Mobile Node
NAT Network Address Translator
PCC Policy Control and Charging
PCRF Policy and Charging Rules Function
PMA Proxy Mobile Agent
PMIPv6 Proxy Mobile IPv6
PLMN Public Land Mobile Network
VPLMN Visited PLMN

The invention claimed is:

1. A Local Breakout Gateway node for use in a hierarchical mobile network, the node comprising:
   a database comprising a plurality of Local Breakout Policy rules;
   a registration means for registering a Mobile Node in a home network via a visited network, wherein a Local Breakout Policy Rule associated with the Mobile Node is determined during the registering and is stored as one of the plurality of Local Breakout Policy Rules in the database;
   a receiver for receiving an IP packet from the Mobile Node attached to the network at which the node is located, the network being the visited network for the Mobile Node, and the Mobile Node having a Global Home Address and a Local Home Address;
   extraction means for extracting 5-tuple flow information from the IP packet;
   selection means for selecting the Local Breakout Policy associated with the Mobile Node from the plurality of Local Breakout Policy rules, the selected Local Breakout Policy including a 5-tuple corresponding to the extracted 5-tuple flow information from the IP packet;
   application means to apply the selected Local Breakout Policy to the received IP packet;
   a Network Address Translation function to apply a Network Address Translation in accordance with the applied Local Breakout Policy to the received IP packet; and
   a transmitter for sending the IP packet to a destination according to the applied Local Breakout Policy.

2. The Local Breakout Gateway node according to claim 1, further comprising an Application Layer Gateway function for performing Application Layer Gateway processing.

3. The Local Breakout Gateway node according to claim 1, further comprising:
   receiving means for receiving signaling from a Local Breakout Gateway node in the Mobile Node's home network, the signaling relating to Local Breakout policy negotiation; and
   means for updating the database as a result of the Local Breakout policy negotiation.

4. The Local Breakout Gateway node according to claim 3, wherein the signaling is sent between the Local Breakout node in the visited network and the Local Breakout node in the home network using an extended mobility protocol.

5. The Local Breakout Gateway node according to claim 4, further comprising:
   transmission means for sending Local Breakout policy information to a Local Breakout Gateway node in a home network, the information being sent in a Proxy Binding Update message, the Proxy Binding Update, message indicating the capability of the visited network for performing Local Breakout; and
   receiving means for receiving Local Breakout policy information from a Local Breakout Gateway node in a home network, the Local Breakout policy information being sent in a Proxy Binding Acknowledgement message.

6. The Local Breakout Gateway node according to claim 3, wherein the signaling is sent between the Local Breakout node in the home network and the Local Breakout node in the visited network via Policy and Charging Rules Function nodes in the home and visited networks respectively.

7. The Local Breakout Gateway node according to claim 1, further comprising means to insert a tag into the IP packet header, the tag indicating the routing path of the IP packet according to the Local Breakout Policy applied.

8. The Local Breakout Gateway node according to claim 1, wherein the database comprises:
   a data entry identifying the Mobile Node;
   for each entry, a permanent IP address and a transient IP address assigned to the Mobile Node; and
   at least one Local Breakout policy to be applied to the Mobile Node.

9. The Local Breakout Gateway node according to claim 8, wherein the database further comprises an indication of priority associated with each Local Breakout policy, the indication of priority being used to select a Local Breakout policy for the IP packet in the event that more than one Local Breakout policy, with a 5-tuple, applies to the IP packet.

10. A method of applying Local Breakout to an IP packet, at a Local Breakout node located in a visited network, the method comprising:
    registering a Mobile Node in a home network via a visited network, wherein a Local Breakout Policy Rule associated with the Mobile Node is determined during the registering and is stored as one of the plurality of Local Breakout Policy Rules in the database;
    receiving an IP packet from a Mobile Node attached to the visited network, the Mobile Node having a Global Home Address and a Local Home Address;
    extracting 5-tuple flow information from the IP packet;
    selecting the Local Breakout Policy associated with the Mobile Node from the plurality of Local Breakout Policy rules stored in a database, the selected Local Breakout Policy including a 5-tuple corresponding to the extracted 5-tuple flow information;
    applying the selected Local Breakout Policy to the received IP packet;
    applying a Network Address Translation in accordance with the applied Local Breakout Policy to the received IP packet; and
    transmitting the IP packet to a destination according to the applied Local Breakout Policy.

11. The method of applying Local Breakout to an IP packet according to claim 10, the method further comprising applying Application Layer Gateway processing to the IP packet prior to applying the Network Address Translation to the IP packet.

12. The method of applying Local Breakout to an IP packet according to claim 10, the method further comprising:
    receiving signaling from a Local Breakout Gateway node in the Mobile Node's home network, the signaling relating to Local Breakout policy negotiation; and
    updating the database as a result of the Local Breakout policy negotiation.

* * * * *